(12) United States Patent
Bullivant et al.

(10) Patent No.: US 11,035,828 B2
(45) Date of Patent: Jun. 15, 2021

(54) ACOUSTIC SENSOR (71) Applicant: TTP Plc, Royston (GB)

(72) Inventors: Harry Bullivant, Royston (GB); Adam Jackson, Royston (GB); Justin Buckland, Royston (GB)

(73) Assignee: TTP Plc, Royston (GB)

( * ) Notice: Subject to any disclaimer, the term of this patent is extended or adjusted under 35 U.S.C. 154(b) by 0 days.

(21) Appl. No.: 16/500,731

(22) PCT Filed: Apr. 11, 2018

(86) PCT No.: PCT/GB2018/050963
§ 371 (c)(1),
(2) Date: Oct. 3, 2019

(87) PCT Pub. No.: WO2018/193226
PCT Pub. Date: Oct. 25, 2018

(65) Prior Publication Data
US 2020/0116671 A1 Apr. 16, 2020

(30) Foreign Application Priority Data
Apr. 21, 2017 (GB) ..................................... 1706393

(51) Int. Cl.
*G01N 29/22* (2006.01)
*G01N 29/036* (2006.01)
(Continued)

(52) U.S. Cl.
CPC ......... *G01N 29/222* (2013.01); *G01N 29/036* (2013.01); *G01N 29/2437* (2013.01);
(Continued)

(58) Field of Classification Search
CPC ............... G01N 29/222; G01N 29/036; G01N 29/2437; G01N 29/024; G01N 29/22; G01N 2291/014; G01N 2291/2012
(Continued)

(56) References Cited

U.S. PATENT DOCUMENTS

2010/0310397 A1* 12/2010 Janse Van Rensburg ................... F04B 43/04
417/488
2014/0050604 A1 2/2014 Campbell et al.

FOREIGN PATENT DOCUMENTS

WO 2013/083978 A1 6/2013

OTHER PUBLICATIONS

International Search Report dated Jun. 20, 2018, in International Application No. PCT/GB2018/050963; Filed: Apr. 11, 2018; Applicant: TTP PLC.
(Continued)

*Primary Examiner* — Tarun Sinha
(74) *Attorney, Agent, or Firm* — Erise IP, P.A.

(57) ABSTRACT

An acoustic sensor, comprising: a side wall, closed by first and second end walls to form a substantially cylindrical cavity for containing a fluid, wherein a radius, a, of the cavity and an axial height, h, of the cavity satisfies the inequality a/h is greater than 1.2; a transmitter, operatively associated with one of the first and second end walls; a receiver, operatively associated with the other of the first and second end walls; and a first stiffener plate, comprising an outer peripheral edge and an aperture which defines an inner peripheral edge, and located on an outer face of the first end wall such that the aperture overlies the axis of the cavity; wherein: the first end wall comprises at least one through-hole, located radially of the axis of the cavity between the inner and outer peripheral edges of the first stiffener plate; the first stiffener plate comprises at least one duct, which
(Continued)

connects the at least one through-hole, of the first end wall, to at least one of the inner and outer peripheral edges of the first stiffener plate, thereby to provide at least one fluid passageway between the cavity and the external surroundings of the acoustic sensor via the first end wall; and in use: the transmitter causes oscillatory motion, of the one of the first and second end walls with which the transmitter is associated, in a direction substantially perpendicular to the plane of that end wall, such that axial oscillations of that end wall drive substantially radial oscillations of a fluid pressure in the cavity; and the substantially radial oscillations in the pressure of the fluid drive oscillatory motion of the other of the first and second end walls, with which the receiver is associated, generating an electrical signal.

37 Claims, 5 Drawing Sheets

(51) Int. Cl.
  *G01N 29/24* (2006.01)
  *G01N 29/28* (2006.01)
(52) U.S. Cl.
  CPC ....... *G01N 29/28* (2013.01); *G01N 2291/014* (2013.01); *G01N 2291/0212* (2013.01)
(58) Field of Classification Search
  USPC ........................................................ 73/24.06
  See application file for complete search history.

(56) References Cited

OTHER PUBLICATIONS

Written Opinion of the International Searching Authority dated Jun. 20, 2018, in International Application No. PCT/GB2018/050963; Filed: Apr. 11, 2018; Applicant: TTP PLC.

* cited by examiner

ACOUSTIC SENSOR

RELATED APPLICATIONS

The present application is a national stage application under 35 U.S.C. § 371 of International Application No. PCT/GB2018/050963, filed 11 Apr. 2018, which claims priority to Great Britain Patent Application No. 1706393.4, filed 21 Apr. 2017. The above referenced applications are hereby incorporated by reference into the present application in their entirety.

FIELD OF THE INVENTION

The present invention relates to an acoustic sensor, and in particular to an acoustic sensor having a generally disc-shaped acoustic cavity and a duct arrangement to allow fluid to enter and leave the cavity.

BACKGROUND OF THE INVENTION

Devices which determine the composition of a gas mixture by measuring the speed of sound in that mixture are well known in the prior art. The two most prevalent techniques are the time-of-flight technique and the resonant cavity technique. The drawbacks and limitations of each type of device are summarised below.

A time-of-flight device uses a pair of transducers to transmit and receive short (typically on the order of microseconds) pulses of acoustic energy. Alternatively a single transducer can be used to send and receive in a pulse-echo mode. The speed of sound is determined by measuring the time taken for these pulses to travel a known distance through the test fluid. In the devices referenced above, the composition of a binary gas mixture is determined from this measurement. Typical limitations of such devices include signal attenuation, echoes, dimensional stability, poor temperature compensation, parasitic conduction, and poor pulse shaping and pulse shape distortion. These problems limit both the performance and long-term stability of time-of-flight devices.

Resonant cavity devices measure the resonant frequency of an acoustic cavity. When the acoustic cavity is filled with a fluid, the resonant frequency of the cavity directly relates to the composition and physical properties of the fluid. A limitation of the devices described in the prior art is the difficulty of efficiently exciting a single resonant mode in the cavity. Many competing resonant modes may exist within the sensor including radial, axial and angular modes. Excitation of multiple modes complicates the interpretation of the output of the sensor.

Poor coupling between the, typically axial, motion of the transmitting transducer into the resonant mode of the cavity, and poor coupling between the resonant mode of the cavity and the receiving transducer produces a weak signal. Sources of electrical noise in the receiver such as parasitic signals passing from the transmitting transducer to the receiver through the structure of the device, or mechanical resonance of components such as the diaphragm, can be of a magnitude comparable to the signal itself.

The shortcomings of the above resonant sensors are shared by devices based upon a Helmholtz oscillator. In such a device the air in the neck of the aperture of a cavity vibrates causing pressure oscillations in that cavity which oppose the motion of the air in the neck, leading to simple harmonic motion. The change in acoustic intensity resultant from changing density and speed of sound of the fluid in the cavity may be used to measure the composition of a mixture of hydrogen and air. This has the additional disadvantage that the single aperture in the resonant cavity prevents a flow of fluid from passing through the sensor cavity, which is desirable for a fast response time and ease of integration into a fluidic system.

Given the shortcomings of time-of-flight and existing resonant cavity speed-of-sound sensors, there is a need for speed-of-sound sensor capable of efficiently generating a resonant oscillation significantly larger than competing resonant modes and parasitic oscillations. The efficient generation of a large amplitude radial mode pressure oscillation at the resonant frequency of the cavity overcomes many of the limitations of the prior art.

The efficient generation of resonant acoustic standing waves has been addressed in the field of fluid pumping. Pumps are known which have substantially disc shaped cavities with high aspect ratios (i.e. the ratio of the radius of the cavity to the height of the cavity) and which in operation generate a resonant acoustic standing wave in those cavities.

A pump disclosed in FIG. 1 of WO2006/111775 has a substantially cylindrical cavity 11 comprising a side wall 14 closed at each end by end walls 12, 13. The pump also comprises an actuator 20 that drives one or both of the end walls to oscillate in a direction substantially perpendicular to the surface of the plane of the end walls, referred to hereinafter as "axial oscillations". In this geometry, the mechanical stiffness of the actuator is well matched to the acoustic impedance of the cavity, enabling efficient generation of a high amplitude pressure oscillation.

The efficient generation of a pressure oscillation in such a cavity is further dependent on the matching of the spatial profile of the fluid oscillation in the cavity and the motion of the driven end wall. When the spatial profiles are well matched, work done by the actuator on the fluid in the cavity adds constructively, thereby enhancing the amplitude of the pressure oscillation in the cavity and delivering improved pump efficiency, referred to herein as mode-shape matching. Conversely, in a pump where the spatial profiles are poorly matched, work done by some regions of the end wall on the fluid reduces rather than enhances the amplitude of the fluid pressure oscillation in the fluid within the cavity. Thus, the useful work done by the actuator on the fluid is reduced and the pump becomes less efficient.

The acoustic gas sensor outlined in WO2013/083978 has demonstrated feasibility of a speed-of-sound fluid sensor that overcomes many of the limitations of prior art by utilising radial pressure oscillations in a substantially cylindrical cavity formed by a side wall and two end walls. A transducer, referred to hereinafter as the "transmitter", is operatively associated with one of the end walls to cause an oscillatory motion of the associated end wall whereby axial oscillations of the end wall drive radial oscillations of the fluid pressure in the cavity. The radial pressure oscillation in the cavity generates axial motion of the second end wall which is operatively associated with a second transducer, referred to hereinafter as the "receiver", which in turn generates an oscillatory electrical signal. By comparing the signal used to drive the transmitter to the signal generated by the receiver, properties of the fluid in the acoustic cavity can be determined. In operation both the mechanical stiffness of the transmitter and the receiver of such a device are deliberately matched to the acoustic impedance of the disc shaped volume of fluid in the cavity. This disc shaped geometry is also suitable for achieving good spatial matching between the displacement profiles of the transmitter and receiver and the radial fluid pressure oscillation in the cavity. The combination of these properties enables efficient generation of high amplitude pressure oscillations by the transmitter and efficient generation of an output signal from the receiver, overcoming many of the limitations of the prior art.

In sensing applications, it is desirable to monitor a broad range of gasses with a wide range of speeds of sound, including those with high speeds of sound such as helium and hydrogen, and those with low speeds of sound such as carbon dioxide. These gases will have acoustic resonances covering a wide range of frequencies. In order for a resonant acoustic gas sensor to work reliably and accurately, the mechanical resonant frequencies of the sensor must not be in the frequency range over which the acoustic resonant frequency associated with a particular gas might be expected. This is because mechanical resonant modes that can be excited by motion of the transmitting transducer cause parasitic signals to pass from the transmitting transducer to the receiver through the structure of the device. These parasitic signals can be of a magnitude at least comparable to the signal associated with acoustic resonance that is transmitted through the fluid in the cavity itself. In practice, the widest frequency range in which there are no parasitic structural resonances is that between zero and the lowest mechanical resonant frequency. As such it is desirable for the acoustic resonance to be located in this range to enable as wide an operational frequency range as possible.

For the resonant acoustic sensor described in WO2013/083978 based on a radial pressure mode described above, the acoustic resonant frequency is linearly proportional to gas speed of sound for a given cavity diameter. This means that for gases with a high speed of sound, the mechanical resonant frequencies of the sensor must be increased. Increasing the cavity diameter to lower the acoustic resonance may be considered but is impractical in many instances because the size of the sensor cannot be increased. Furthermore, in general, increasing the cavity diameter lowers the mechanical resonant frequencies of the sensor proportionally more than the acoustic resonance, thereby narrowing the operational range of speeds of sound of the sensor.

The resonant frequencies of the mechanical modes of the sensor can be increased by stiffening the structure. However, crucially, many approaches to stiffening the structure result in poorer sensor performance overall, as other desirable properties of the sensor are worsened as a result. This means that these approaches lead to a compromise between sensor attributes, as detailed below.

The sensor comprises a cylindrical cavity bounded by a side wall and two end walls containing inlet holes and with piezoelectric discs attached. The inlet holes allow fluid to enter the cavity and are preferably positioned at nodal positions of the operational acoustic mode. This is to ensure that acoustic damping introduced by viscous losses arising from oscillatory motion of the fluid in and out of these holes is minimised. Acoustic damping lowers and broadens the resonant peak, which worsens the sensor's accuracy and signal-to-noise ratio. Preferably the length of these inlet holes is small, to ensure that fluid diffuses into the cavity quickly. The response time of the sensor is governed by how quickly fluid in the cavity can be replaced and it is desirable for the response time of the sensor to be as short as possible.

The end walls are typically supported by rigid structures, with dimensions chosen to control the structural resonant frequencies of the sensor and to improve mode-shape matching. For example, in the case where the first order radial acoustic resonance is driven and detected, the end wall is clamped along a circular perimeter, herein 'transducer diameter', inboard of the diameter of the cavity itself but axially concentric with it. This constrains motion of the end wall in regions between the cavity diameter and transducer diameter, but permits motion of the end wall in regions within the transducer diameter. This clamping is typically achieved by an annular member attached to the end wall.

The first structural resonant frequency of the sensor can be increased by reducing the area over which there is motion of the end walls. That is, the structure can be stiffened by reducing the diameter of the transducer. In practice this is achieved by substantially thickening the end walls over regions where end wall motion is to be limited. However, in order to maximise the signal to noise ratio of the sensor, the inlet holes must be positioned at a nodal pressure position of the operational acoustic mode. Therefore, although reducing the diameter of the transmit/receive transducers stiffens the structure, the pitch circle diameter of the inlet holes may need to be reduced to accommodate this stiffer structure and avoid the inlet holes being blocked by material required to stiffen the structure. Moving these inlet holes from nodal positions increases acoustic damping and worsens the signal to noise ratio of the sensor.

The structure can also be stiffened by increasing the thickness of the transducers, without having to reduce their diameter. That is, the entirety of the end wall can be thickened, not just in regions where end wall motion is to be limited. However, increasing the thickness of the transducer has a proportionally smaller impact on increasing the structural stiffness than reducing the diameter of the transducer. The resonant frequency of the transducer is proportional to its thickness divided by the square of its diameter. Therefore to achieve the same increase in resonant frequency, the fractional increase in the transducer thickness must be twice the fractional decrease in the transducer diameter. A thicker end wall reduces the displacement of the transducer for a given input energy and consequently reduces the mechanical-acoustic coupling. This results in a weaker acoustic resonance signal and reduced signal-to-noise ratio for the same input power.

Inlet holes are preferably located near the pressure node of the first radial acoustic resonance of the cavity, that is on a circle with diameter approximately 0.63 times the cavity diameter. If the positions of the inlet holes are fixed on this location, and if the diameter of the transducer has to be reduced in order to increase the resonant frequencies of the mechanical modes of the sensor, then one solution is to create a set of substantially vertical holes through the thicker regions of the end wall. This allows gas to access the inlet holes without needing to change their position. However, in doing so the response time of the sensor increases significantly because these holes act as long, narrow tubes through which gas must diffuse. Widening the diameter of these holes to improve the response time is undesirable because it reduces the stiffness of the structure and reduces its mechanical resonance frequencies, negating the effect of a smaller transducer diameter. The same is true of reducing the height of the rigid structure, which also reduces mechanical resonance frequencies.

A separate solution is to add inlet holes at the circumference of the cavity, leaving the transducers unmodified. However, as these holes are not at nodal positions, they must be small to avoid adding significant acoustic damping. Small inlet holes result in slow diffusion of gas into the cavity, so this introduces a compromise between response time and signal to noise ratio.

As such, for radial acoustic resonance-based sensors, there remains a need to monitor high speed of sound gases without compromising on the response time or signal-to-noise ratio of the sensor.

SUMMARY OF THE INVENTION

According to an aspect of the invention, there is provided an acoustic sensor, comprising: a side wall, closed by first and second end walls to form a substantially cylindrical cavity for containing a fluid, wherein a radius, a, of the cavity and an axial height, h, of the cavity satisfies the inequality a/h is greater than 1.2; a transmitter, operatively associated with one of the first and second end walls; a receiver, operatively associated with the other of the first and second end walls; and a first stiffener plate, comprising an outer peripheral edge and an aperture which defines an inner peripheral edge, and located on an outer face of the first end wall such that the aperture overlies the axis of the cavity; wherein: the first end wall comprises at least one through-hole, located radially of the axis of the cavity between the inner and outer peripheral edges of the first stiffener plate; the first stiffener plate comprises at least one duct, which connects the at least one through-hole, of the first end wall, to at least one of the inner and outer peripheral edges of the first stiffener plate, thereby to provide at least one fluid passageway between the cavity and the external surroundings of the acoustic sensor via the first end wall; and in use: the transmitter causes oscillatory motion, of the one of the first and second end walls with which the transmitter is associated, in a direction substantially perpendicular to the plane of that end wall, such that axial oscillations of that end wall drive substantially radial oscillations of a fluid pressure in the cavity; and the substantially radial oscillations in the pressure of the fluid drive oscillatory motion of the other of the first and second end walls, with which the receiver is associated, generating an electrical signal.

The provision of a ducted stiffener plate advantageously allows that the structural stiffness of the sensor may be enhanced, while the through-hole(s) of the cavity end wall may be provided in the optimal location, for the best performance of the sensor using a broad range of fluids.

The at least one duct, of the first stiffener plate, may connect the at least one through-hole, of the first end wall, to the inner peripheral edge of the first stiffener plate. The at least one duct, of the first stiffener plate, may connect the at least one through-hole, of the first end wall, to the outer peripheral edge of the first stiffener plate.

At least a portion of the length of the at least one duct, of the first stiffener plate, may extend normal to the axis of the cavity so as to be parallel with the plane of the first end wall. The entire length of the at least one duct, of the first stiffener plate, may extend normal to the axis of the cavity so as to be parallel with the plane of the first end wall. The at least one duct, of the first stiffener plate, may extend along the said outer face of the first end wall, so as to take the shortest route between the at least one through-hole, of the first end wall, and the respective inner or outer peripheral edge of the first stiffener plate.

The first end wall may comprise a plurality of the said through-holes; and the first stiffener plate may comprise a plurality of the said ducts, each duct, of the first stiffener plate, connecting a respective one of the plurality of through-holes, of the first end wall, to the respective at least one of the inner and outer peripheral edges of the first stiffener plate, thereby to provide a plurality of fluid passageways between the cavity and the external surroundings of the acoustic sensor via the first end wall.

One or more of the said through-holes, of the first end wall, may be located at a nodal pressure position of the radial pressure oscillation which is generated in the cavity in use. The said nodal pressure position may be a radially innermost nodal pressure position, of the radial pressure oscillation which is generated in the cavity in use.

A plurality of the said through-holes, of the first end wall, may be arranged so as to be equally spaced around a circumference of a circle which is axially concentric with the cavity.

An axial thickness of the first stiffener plate may be greater than an axial thickness of the first end wall.

The transmitter may be operatively associated with the first end wall by being attached to the said outer face of the first end wall at a location which is within the inner peripheral edge of the first stiffener plate.

The inner peripheral edge of the first stiffener plate may define a circle. The outer peripheral edge of the first stiffener plate may define a circle. The outer peripheral edge of the first stiffener plate may define a rectangle. In the case that each of the inner and outer peripheral edges of the first stiffener plate defines a circle, the first stiffener plate may be described as a first stiffener ring.

An axis of the aperture of the first stiffener plate may be parallel with the axis of the cavity. The aperture of the first stiffener plate may overlie the axis of the cavity such that the aperture is axially concentric with the cavity.

The first stiffener plate and the first end wall may be of unitary construction. The first stiffener plate may be attached to the outer face of the first end wall.

The acoustic sensor may comprise: a second stiffener plate, comprising an outer peripheral edge and an aperture which defines an inner peripheral edge, and located on an outer face of the second end wall such that the aperture overlies the axis of the cavity.

The second end wall may comprise at least one through-hole, located radially of the axis of the cavity between the inner and outer peripheral edges of the second stiffener plate; and the second stiffener plate may comprise at least one duct, which connects the at least one through-hole, of the second end wall, to at least one of the inner and outer peripheral edges of the second stiffener plate, thereby to provide at least one fluid passageway between the cavity and the external surroundings of the acoustic sensor via the second end wall.

The at least one duct, of the second stiffener plate, may connect the at least one through-hole, of the second end wall, to the inner peripheral edge of the second stiffener plate. The at least one duct, of the second stiffener plate, may connect the at least one through-hole, of the second end wall, to the outer peripheral edge of the second stiffener plate.

At least a portion of the length of the at least one duct, of the second stiffener plate, may extend normal to the axis of the cavity so as to be parallel with the plane of the second end wall. The entire length of the at least one duct, of the second stiffener plate, may extend normal to the axis of the cavity so as to be parallel with the plane of the second end wall. The at least one duct, of the second stiffener plate, may extend along the said outer face of the second end wall, so as to take the shortest route between the at least one through-hole, of the second end wall, and the respective inner or outer peripheral edge of the second stiffener plate.

The second end wall may comprise a plurality of the said through-holes; and the second stiffener plate may comprise a plurality of the said ducts, each duct, of the second stiffener plate, connecting a respective one of the plurality of through-holes, of the second end wall, to the respective at least one of the inner and outer peripheral edges of the second stiffener plate, thereby to provide a plurality of fluid passageways between the cavity and the external surroundings of the acoustic sensor via the second end wall.

One or more of the said through-holes, of the second end wall, may be located at a nodal pressure position of the radial pressure oscillation which is generated in the cavity in use. The said nodal pressure position may be a radially innermost nodal pressure position, of the radial pressure oscillation which is generated in the cavity in use.

A plurality of the said through-holes, of the second end wall, may be arranged so as to be equally spaced around a circumference of a circle which is axially concentric with the cavity.

An axial thickness of the second stiffener plate may be greater than an axial thickness of the second end wall.

The receiver may be operatively associated with the second end wall by being attached to the said outer face of the second end wall at a location which is within the inner peripheral edge of the second stiffener plate.

The inner peripheral edge of the second stiffener plate may define a circle. The outer peripheral edge of the second stiffener plate may define a circle. The outer peripheral edge of the second stiffener plate may define a rectangle. In the case that each of the inner and outer peripheral edges of the second stiffener plate defines a circle, the second stiffener plate may be described as a second stiffener ring.

An axis of the aperture of the second stiffener plate may be parallel with the axis of the cavity. The aperture of the second stiffener plate may overlie the axis of the cavity such that the aperture is axially concentric with the cavity.

The second stiffener plate and the second end wall may be of unitary construction. The second stiffener plate may be attached to the outer face of the second end wall.

BRIEF DESCRIPTION OF THE DRAWINGS

Embodiments will now be described, by way of example, with reference to the accompanying figures in which.

DETAILED DESCRIPTION OF EMBODIMENTS OF THE INVENTION

In the following detailed description of several illustrative embodiments, reference is made to the accompanying drawings that form a part hereof, and in which is shown by way of illustration specific preferred embodiments in which the invention may be practised. These embodiments are described in sufficient detail to enable those skilled in the art to practise the invention, and it is understood that other embodiments may be utilised and that logical structural, mechanical, electrical and chemical changes may be made without departing from the scope of the invention. To avoid detail not necessary to enable those skilled in the art to practice the embodiments described herein, the description may omit certain information known to those skilled in the art. The following detailed description is, therefore, not to be taken in a limiting sense.

FIG. 1 shows a schematic cross section of an embodiment of the acoustic sensor according to the present invention with the section plane passing parallel to, and through, four ducts. A cavity 2 is defined by end walls 3 and 4, and a side wall 5. A backer, or stiffener plate 11 (which two terms are used interchangeably herein), attaches to a disc 6. An through-hole 13 in the disc 6 and a duct 12 in the backer 11 allows for fluid communication between the cavity 2 and the surroundings 14. The surroundings here defined as being regions both above and around the sensor. The cavity 2 and an aperture 1 are substantially circular in cross section as drawn, similar to the pump disclosed in WO2006/111755 and the acoustic sensor disclosed in WO2013/083978 which also contain substantially circular cavities. While this example in FIG. 1 has a cavity with a circular cross-section, it will be apparent to one skilled in the art that other shapes can be used. Substantially circular cross-sectional shapes provide advantages in favourable matching between the displacement of the end wall and the mode shape of the fluid in the cavity at resonance as discussed in WO2013/083978. Similar shapes including, but not limited to, a cavity with a cross-section in the shape of an ellipse, hypoellipse or hyperellipse share many of these benefits. In operation the sensor generates radial acoustic pressure oscillations. In particular, when the cavity radius a is greater than 1.2 times the height h of the cavity, i.e. a/h is greater than 1.2, the lowest frequency radial mode of oscillation of the fluid in the cavity has a lower frequency than any longitudinal modes of the cavity. In operation it is preferable that the lowest frequency radial mode is at a frequency of 20 kHz or higher so that the device is inaudible in operation. A frequency of approximately 20 kHz or higher provides operation above the threshold of normal human hearing.

Figure 1A:
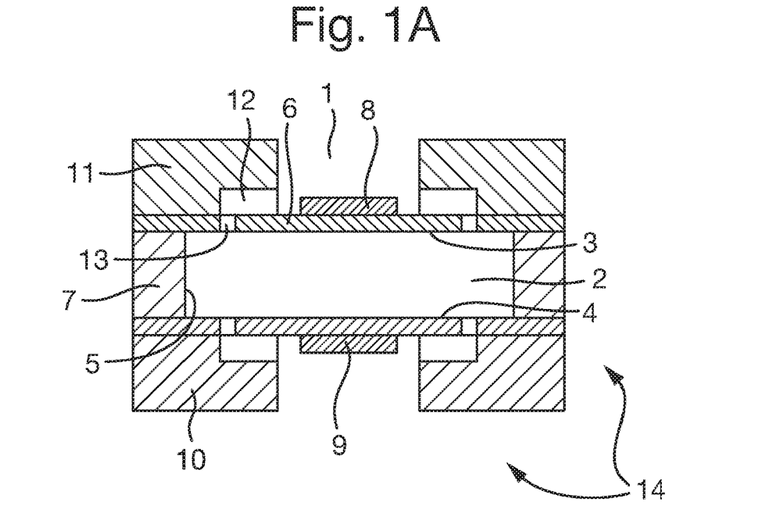
FIG. 1A shows a schematic cross-section of an embodiment of an acoustic sensor according to the invention.

The duct arrangement described above allows the apertures in the end wall to be fixed at nodal points of the radial acoustic mode, if preferred, while the effective diameter of the transducer is reduced. As only a small amount of material is removed to form these small, narrow ducts, the stiffness of the structure is not impacted significantly; allowing the mechanical resonant frequencies of the transducer to be raised and high speed of sound gases to be accommodated by the sensor. Although the cross sectional area of these channels is small, diffusion times are not significantly worsened relative to an open design because the length of these channels is small in comparison to the height of the backer and cavity diameter.

To avoid inefficient operation resultant from high viscous losses in the fluid in the cavity, the height of the cavity should be at least twice the thickness of the viscous boundary layer in the fluid:

$$h > 2\sqrt{\frac{2\mu a}{\rho k_0 c}} \; ; k_0 \approx 3.83. \qquad \text{[Eqn. 1]}$$

Where μ is the viscosity of the fluid, ρ is the density of the fluid, c is the speed of sound in the fluid and $k_0$ is the first root of the derivative of the first order Bessel function of the first kind which describes the shape of the lowest frequency radial mode pressure oscillation and is constant. Rearranging the above expression and substituting in standard values for density and viscosity;

$$\frac{h^2}{a}$$

should be greater than $1\times10^{-7}$ m when the fluid in the cavity is a gas and greater than $4\times10^{-10}$ m when the fluid in the cavity is a liquid. The height of the cavity of such a sensor is typically less than 8 mm, leading to a compact device. In addition to the obvious commercial benefits of a compact sensor, this also reduces the fluid volume in the device increasing the speed at which the sensor can respond to changes in fluid properties.

In the embodiment shown in FIG. 1, the first end wall 3 is defined by the lower surface of the disc 6. The sidewall 5 is defined by a ring 7. The transmitter comprises a piezoelectric disc 8 attached to the disc 6. When an appropriate electrical drive is applied the transmitter is caused to vibrate in a direction substantially perpendicular to the plane of the cavity 2, thereby generating radial pressure oscillations within the fluid in the cavity. The motion of the transmitter is constrained along a perimeter defined by the aperture 1 in the backer 11. The backer is comparatively thicker and stiffer than the disc, which means that the inner region of the disc which interfaces with the aperture 1 moves substantially more in operation than the outer region of the disc that interfaces with the backer. The piezoelectric disc 8 is not required to be formed of a piezoelectric material, but may be formed of any electrically or magnetically active material such as, for example, an electrostrictive or magnetostrictive material. As such, the term "piezoelectric disc" is intended to cover electrostrictive or magnetostrictive discs as well. A duct 12 extends from the aperture 1 and aligns with an through-hole 13 in the disc 6 which forms a fluidic path between the cavity and the surroundings. At least one of these fluidic paths allows fluid to enter the cavity (inlet) and at least one of these apertures allows fluid to leave the cavity (outlet). The fluid may be transported by diffusion, in which case it may enter and leave the cavity by the same aperture.

Figure 1B:
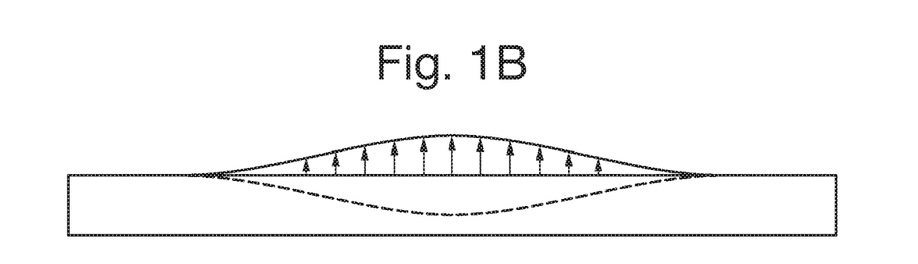
FIGS. 1B to 1D show respectively the displacement profile of an end wall of the sensor, a graph of the pressure oscillations within the cavity of the sensor, and the displacement profile of another end wall of the sensor.

FIG. 1B shows a typical displacement profile of the first end wall of the cavity along a line bisecting the cavity. The solid curved line and arrows indicate the wall displacement at one point in time and the dashed curved line its displacement one half-cycle later. Note that the displacements as drawn in this figure and the other figures are exaggerated and the piezoelectric discs are omitted from the drawing for clarity.

Figure 1C:
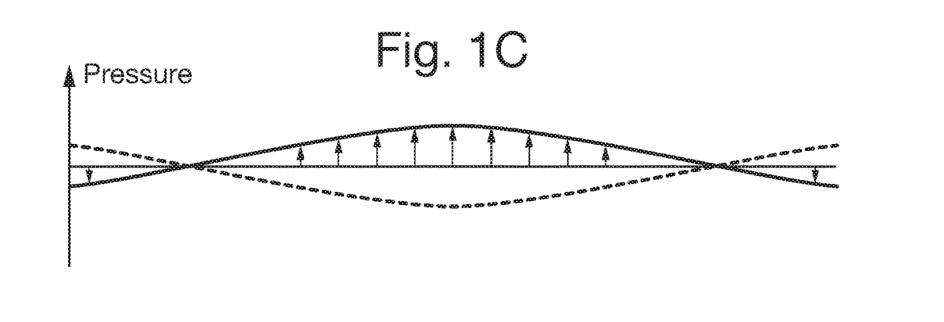

FIG. 1C shows a typical pressure oscillation profile for the cavity shown in FIG. 1A and FIG. 1B. The solid curved line and arrows indicate the pressure at one point in time, and the dashed curved line the pressure one half-cycle later. The radial dependence of this pressure oscillation p(r) approximates the form of the Bessel function:

$$p(r) = p_0 J_0\left(\frac{k_0 r}{a}\right); k_0 \approx 3.83. \quad [\text{Eqn. 2}]$$

Where $p_0$ is the maximum amplitude of the pressure oscillation, $J_0$ is the first order Bessel function of the first kind, $k_0$ is the first root of the derivative of that function, r is the radial position in the cavity and a is the radius of the cavity. In this case, the motion of the first end wall 3 and the pressure oscillation in the cavity show significant mode-shape matching. The embodiment disclosed in FIG. 1 shows an acoustic sensor wherein, in use, the lowest frequency, also known as lowest order or fundamental, mode of radial pressure oscillation is generated in the cavity. An acoustic sensor can be embodied wherein, in use, pressure oscillations with a radial mode possessing a resonant frequency higher than the fundamental mode are generated. These higher frequency oscillations are referred to as higher order radial modes of pressure oscillation in the cavity.

Figure 1D:
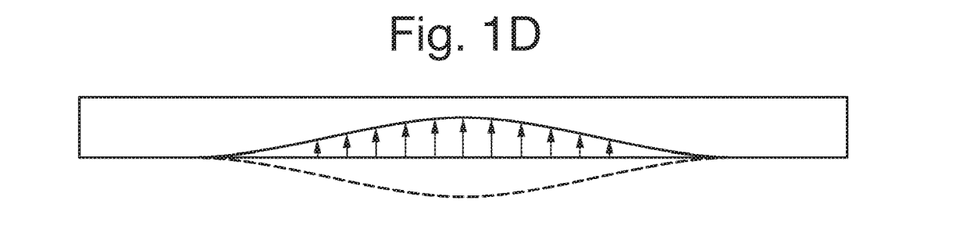

The pressure oscillation in the cavity shown in FIG. 1C drives a displacement in the second end wall 4. This displacement is shown in FIG. 1D. No phase relationship between the oscillations shown in FIGS. 1B, 1C and 1D should be inferred.

The receiver comprises a piezoelectric disc 9 attached to a disc 10. The displacement of the second end wall 4 causes an electrical signal to be generated by the piezoelectric disc 9. By comparison of the signal used to drive the transmitter and the signal generated by the receiver, properties of the fluid in the acoustic cavity can be determined such as the composition of a binary mixture of gases, temperature of a known fluid, density of a fluid or viscosity a fluid.

Figure 2A:
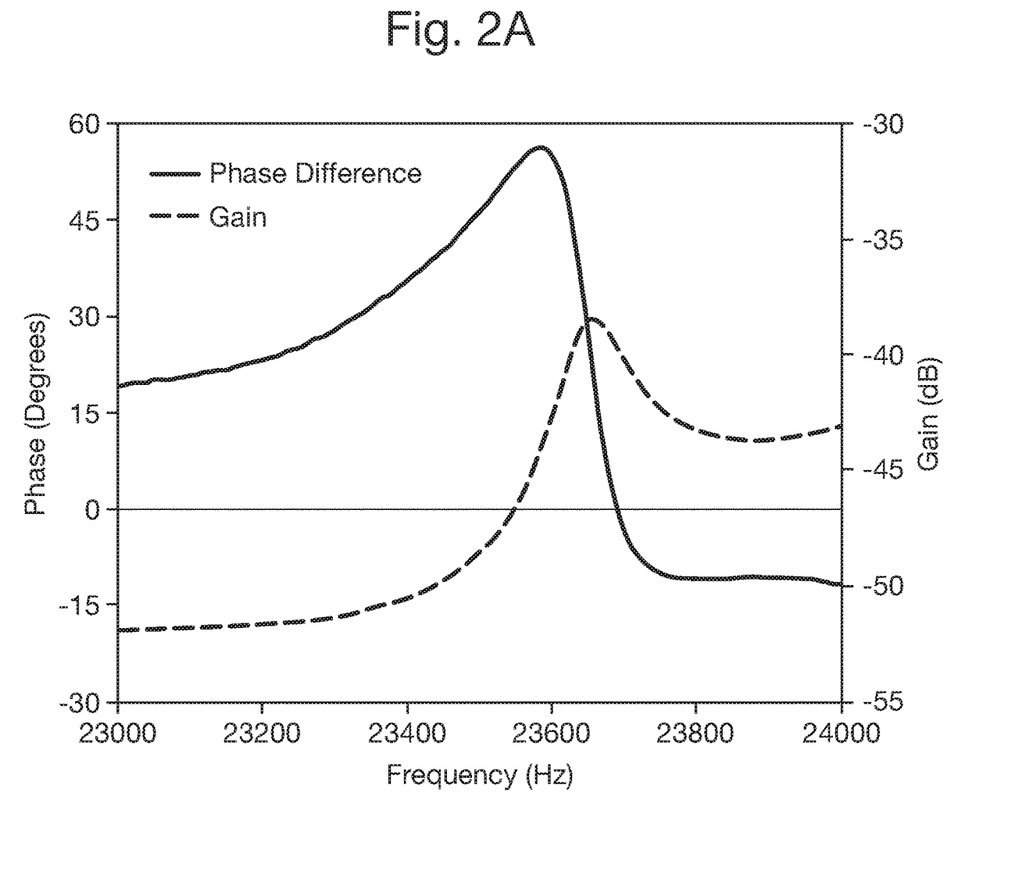
FIGS. 2A and 2B show respectively typical phase difference and gain between transmitter and receiver in the vicinity of the cavity resonance for an embodiment of the acoustic sensor and typical gain between transmitter and receiver over a frequency range which includes the cavity resonance and lowest mechanical mode of the sensor.

The acoustic sensor disclosed here can be used to measure the speed of sound in a fluid or a mixture of fluids. The resonant frequency of pressure oscillation $f_0$ disclosed in Equation 3 is described by the expression:

$$f_0 = \frac{k_0 c}{2\pi a}; k_0 \approx 3.83. \quad [\text{Eqn. 3}]$$

Where $k_0$ is the first root of the derivative of the first order Bessel function of the first kind, c is the speed of sound in the cavity and a is the radius of the cavity. The resonant frequency of the pressure oscillation can be determined by observing the frequency at which the electrical amplitude gain between the transmitter and the receiver is maximised. One way to embody this would be to sweep the frequency of the electrical driving signal to the transmitter, recording the gain at each frequency. Similarly, the resonant frequency can be determined by comparing the phase of the input signal of the transmitter to the output signal of the receiver. One way to embody this would be to sweep the frequency of the drive signal and record the frequency at which the phase difference between the transmitter and the receiver is some constant value. FIG. 2A shows both the phase difference between transmitter and receiver and the electrical gain in the vicinity of the operational cavity resonance for an embodiment of the sensor described herein. One application enabled by accurate measurement of the speed of sound of a fluid is the determination of the composition of a binary mixture of gases. The equations to relate the composition of a binary gas to the speed of sound of a fluid are well known.

Figure 2B:
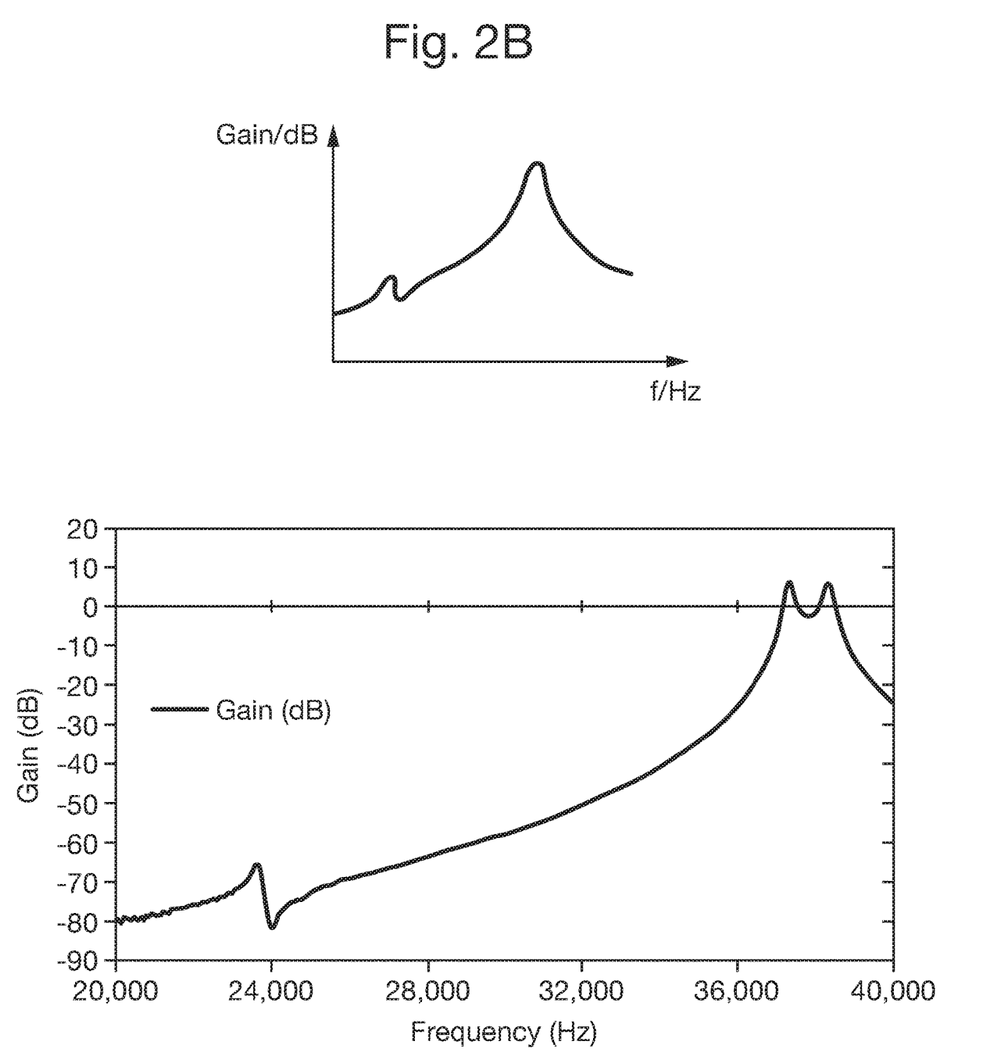

FIG. 2B shows the typical gain between transmitter and receiver over a frequency range which includes the cavity resonance and lowest mechanical resonant modes of the sensor. In this instance the acoustic resonance is positioned at ~23 kHz and the lowest mechanical resonance is positioned at ~38 kHz. In frequency space, for a given gas, the further the lowest mechanical mode of the sensor is from the cavity resonance, the larger the range of speeds of sound that can be monitored.

Figure 3A:
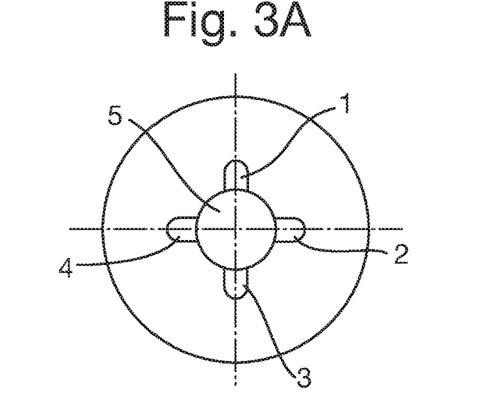
FIGS. 3A and 3B show respective bottom views of two examples of a backer, or stiffener plate, of the sensor.

FIG. 3A shows the bottom view of a backer with several ducts 1-4 that interface with the cylindrical hole 5. The face of the backer shown interfaces with the disc that forms one of the end walls of the cavity of the sensor. Four ducts are depicted although the number may be more or less than this depending on the performance requirements of the sensor. For example, more ducts may be preferred if a shorter response time is desired. Conversely, if the response time of the sensor is not a key consideration, the number of ducts may be reduced to ensure the mechanical stiffness of the backer-end wall sub-assembly is as high as possible. Consequently, this allows as wide a range of speeds of sounds as possible to be measured.

Figure 3B:
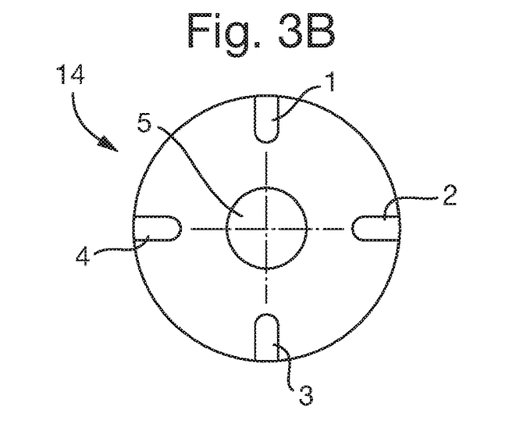

The ducts depicted in FIG. 1 and in FIG. 3A interface with the cylindrical hole but different arrangements are possible. FIG. 3B shows the bottom view of a backer with ducts 1-4 that do not interact with the cylindrical hole 5 but instead extend radially outwards to the surroundings 14.

Figure 3C:
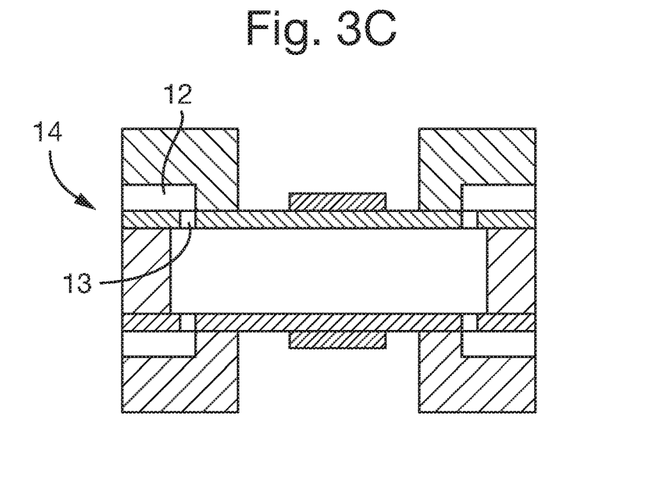
FIG. 3C shows a cross-section of an embodiment of the acoustic sensor wherein a fluidic path length between the cavity and sensor surroundings is minimised.

FIG. 3C shows a cross section of an embodiment of the acoustic sensor that incorporates the backer design depicted in FIG. 3B where a duct 12 aligns with an through-hole 13 in a disc 6. The duct 12 extends radially outwards to the surroundings 14 to minimise the fluidic path length between the cavity and surroundings. A short fluidic path length is desirable in many applications where diffusion of the fluid into the cavity limits the response time of the acoustic sensor to changes in the composition of the fluid in the cavity.

Figure 4:
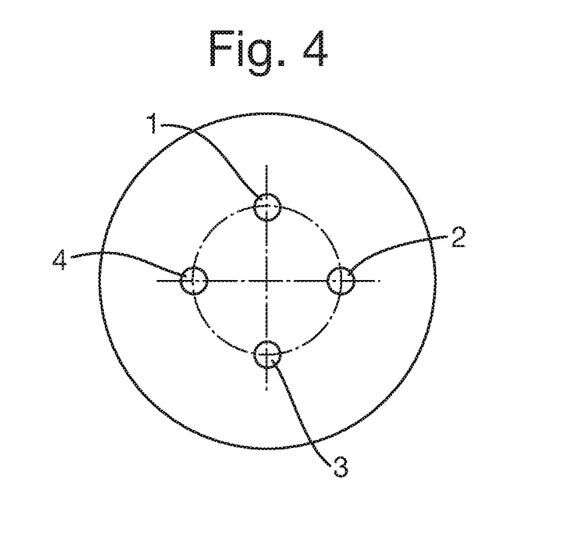
FIG. 4 shows a bottom view of an exemplary end wall.

FIG. 4 shows the bottom view of an embodiment of an end wall. In this embodiment the end wall has four though-holes 1-4. In order to maximize the quality factor of the acoustic resonance excited in the cavity, the apertures should be positioned at nodal pressure positions of the resonant acoustic mode so that acoustic damping originating from oscillatory fluid motion in and out these apertures is minimized. In this embodiment the apertures are positioned at nodal positions of the first order radial acoustic mode but these may also be positioned at the nodal positions of other higher order modes.

Figure 5:
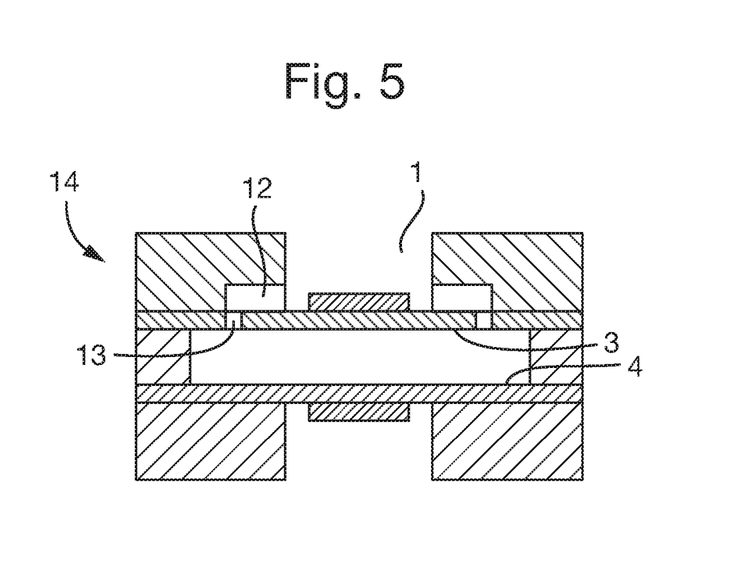
FIG. 5 shows an embodiment of the acoustic sensor where one end wall and associated backer, or stiffener plate, geometry is different to another end wall and associated backer, or stiffener plate, geometry.

FIG. 1 shows an embodiment of the acoustic sensor that is symmetric about the plane which bisects the cavity at its mid-height. However, in some applications it may be desirable for the geometry of the acoustic sensor to be non-symmetric about this plane. For instance, it may be desirable to have fluid entry into the cavity and fluid exit from the cavity from one side of the sensor only. FIG. 5 shows an embodiment of the acoustic sensor where an end wall 3 has an through-hole 13 which aligns with a duct 12. The duct 12 interfaces with an aperture 1 which interfaces with the surroundings 14. A second end wall 4 has no apertures and is solid throughout. Consequently, the second end wall 4 does not permit fluid to pass through it and fluid communication between the cavity and the surroundings is achieved through apertures in the first of the end walls only.

While it may be preferable for respective backers, or stiffener plates, to be attached to each of the respective end walls, embodiments are envisaged where only one backer is attached to only one end wall.

The (each) end wall and the (each) backer/stiffener plate are preferably distinct articles, the backer/stiffener plate being attached to the end wall, by some suitable means (e.g. bonding, welding, brazing, fixing) in the assembled sensor. Alternatively, the (each) end wall and the (each) backer/stiffener plate may be of unitary construction. That is, in an embodiment the end wall and backer/stiffener plate are made integral with one another. In such an embodiment, the backer/stiffener plate may be considered to be a stiffener part, or stiffener portion, of the sensor.

It will be understood that the invention has been described in relation to its preferred embodiments and may be modified in many different ways without departing from the scope of the invention as defined by the accompanying claims.

The invention claimed is:

1. An acoustic sensor, comprising:
   a side wall, closed by first and second end walls to form a substantially cylindrical cavity for containing a fluid, wherein a radius, a, of the cavity and an axial height, h, of the cavity satisfies the inequality a/h is greater than 1.2;
   a transmitter, operatively associated with one of the first and second end walls;
   a receiver, operatively associated with the other of the first and second end walls; and
   a first stiffener plate, comprising an outer peripheral edge and an aperture which defines an inner peripheral edge, and located on an outer face of the first end wall such that the aperture overlies the axis of the cavity;
   wherein:
   the first end wall comprises at least one through-hole, located radially of the axis of the cavity between the inner and outer peripheral edges of the first stiffener plate;
   the first stiffener plate comprises at least one duct, which connects the at least one through-hole, of the first end wall, to at least one of the inner and outer peripheral edges of the first stiffener plate, thereby to provide at least one fluid passageway between the cavity and the external surroundings of the acoustic sensor via the first end wall;
   and in use:
   the transmitter causes oscillatory motion, of the one of the first and second end walls with which the transmitter is associated, in a direction substantially perpendicular to the plane of that end wall, such that axial oscillations of that end wall drive substantially radial oscillations of a fluid pressure in the cavity; and
   the substantially radial oscillations in the pressure of the fluid drive oscillatory motion of the other of the first and second end walls, with which the receiver is associated, generating an electrical signal.

2. An acoustic sensor according to claim 1, wherein the at least one duct, of the first stiffener plate, connects the at least one through-hole, of the first end wall, to the inner peripheral edge of the first stiffener plate.

3. An acoustic sensor according to claim 1, wherein the at least one duct, of the first stiffener plate, connects the at least one through-hole, of the first end wall, to the outer peripheral edge of the first stiffener plate.

4. An acoustic sensor according to claim 1, wherein at least a portion of the length of the at least one duct, of the first stiffener plate, extends normal to the axis of the cavity so as to be parallel with the plane of the first end wall.

5. An acoustic sensor according to claim 4, wherein the entire length of the at least one duct, of the first stiffener plate, extends normal to the axis of the cavity so as to be parallel with the plane of the first end wall.

6. An acoustic sensor according to claim 5, wherein the at least one duct, of the first stiffener plate, extends along the said outer face of the first end wall, so as to take the shortest route between the at least one through-hole, of the first end wall, and the respective inner or outer peripheral edge of the first stiffener plate.

7. An acoustic sensor according to claim 1, wherein:
the first end wall comprises a plurality of the said through-holes; and
the first stiffener plate comprises a plurality of the said ducts, each duct, of the first stiffener plate, connecting a respective one of the plurality of through-holes, of the first end wall, to the respective at least one of the inner and outer peripheral edges of the first stiffener plate, thereby to provide a plurality of fluid passageways between the cavity and the external surroundings of the acoustic sensor via the first end wall.

8. An acoustic sensor according to claim 7, wherein one or more of the said through-holes, of the first end wall, is located at a nodal pressure position of the radial pressure oscillation which is generated in the cavity in use.

9. An acoustic sensor according to claim 8, wherein the said nodal pressure position is a radially innermost nodal pressure position, of the radial pressure oscillation which is generated in the cavity in use.

10. An acoustic sensor according to claim 7, wherein a plurality of the said through-holes, of the first end wall, are arranged so as to be equally spaced around a circumference of a circle which is axially concentric with the cavity.

11. An acoustic sensor according to claim 1, wherein an axial thickness of the first stiffener plate is greater than an axial thickness of the first end wall.

12. An acoustic sensor according to claim 1, wherein the transmitter is operatively associated with the first end wall by being attached to the outer face of the first end wall at a location which is within the inner peripheral edge of the first stiffener plate.

13. An acoustic sensor according to claim 1, wherein the inner peripheral edge of the first stiffener plate defines a circle.

14. An acoustic sensor according to claim 13, wherein the outer peripheral edge of the first stiffener plate defines a circle.

15. An acoustic sensor according to claim 14, wherein the outer peripheral edge of the first stiffener plate defines a rectangle.

16. An acoustic sensor according to claim 15, wherein the aperture of the first stiffener plate overlies the axis of the cavity such that the aperture is axially concentric with the cavity.

17. An acoustic sensor according to claim 16, wherein the first stiffener plate and the first end wall are of unitary construction.

18. An acoustic sensor according to claim 17, wherein the first stiffener plate is attached to the outer face of the first end wall.

19. An acoustic sensor according to claim 1, comprising:
a second stiffener plate, comprising an outer peripheral edge and an aperture which defines an inner peripheral edge, and located on an outer face of the second end wall such that the aperture overlies the axis of the cavity.

20. An acoustic sensor according to claim 19, wherein:
the second end wall comprises at least one through-hole, located radially of the axis of the cavity between the inner and outer peripheral edges of the second stiffener plate; and
the second stiffener plate comprises at least one duct, which connects the at least one through-hole, of the second end wall, to at least one of the inner and outer peripheral edges of the second stiffener plate, thereby to provide at least one fluid passageway between the cavity and the external surroundings of the acoustic sensor via the second end wall.

21. An acoustic sensor according to claim 20, wherein the at least one duct, of the second stiffener plate, connects the at least one through-hole, of the second end wall, to the inner peripheral edge of the second stiffener plate.

22. An acoustic sensor according to claim 20, wherein the at least one duct, of the second stiffener plate, connects the at least one through-hole, of the second end wall, to the outer peripheral edge of the second stiffener plate.

23. An acoustic sensor according to claim 20, wherein at least a portion of the length of the at least one duct, of the second stiffener plate, extends normal to the axis of the cavity so as to be parallel with the plane of the second end wall.

24. An acoustic sensor according to claim 23, wherein the entire length of the at least one duct, of the second stiffener plate, extends normal to the axis of the cavity so as to be parallel with the plane of the second end wall.

25. An acoustic sensor according to claim 24, wherein the at least one duct, of the second stiffener plate, extends along the said outer face of the second end wall, so as to take the shortest route between the at least one through-hole, of the second end wall, and the respective inner or outer peripheral edge of the second stiffener plate.

26. An acoustic sensor according to claim 20, wherein:
the second end wall comprises a plurality of the said through-holes; and
the second stiffener plate comprises a plurality of the said ducts, each duct, of the second stiffener plate, connecting a respective one of the plurality of through-holes, of the second end wall, to the respective at least one of the inner and outer peripheral edges of the second stiffener plate, thereby to provide a plurality of fluid passageways between the cavity and the external surroundings of the acoustic sensor via the second end wall.

27. An acoustic sensor according to claim 26, wherein one or more of the said through-holes, of the second end wall, is located at a nodal pressure position of the radial pressure oscillation which is generated in the cavity in use.

28. An acoustic sensor according to claim 27, wherein the said nodal pressure position is a radially innermost nodal pressure position, of the radial pressure oscillation which is generated in the cavity in use.

29. An acoustic sensor according to claim 26, wherein a plurality of the said through-holes, of the second end wall, are arranged so as to be equally spaced around a circumference of a circle which is axially concentric with the cavity.

30. An acoustic sensor according to claim 19, wherein an axial thickness of the second stiffener plate is greater than an axial thickness of the second end wall.

31. An acoustic sensor according to claim 19, wherein the receiver is operatively associated with the second end wall by being attached to the said outer face of the second end wall at a location which is within the inner peripheral edge of the second stiffener plate.

32. An acoustic sensor according to claim 19, wherein the inner peripheral edge of the second stiffener plate defines a circle.

33. An acoustic sensor according to claim 19, wherein the outer peripheral edge of the second stiffener plate defines a circle.

34. An acoustic sensor according to claim 19, wherein the outer peripheral edge of the second stiffener plate defines a rectangle.

35. An acoustic sensor according to claim 19, wherein the aperture of the second stiffener plate overlies the axis of the cavity such that the aperture is axially concentric with the cavity.

36. An acoustic sensor according to claim 19, wherein the second stiffener plate and the second end wall are of unitary construction.

37. An acoustic sensor according to claim 19, wherein the second stiffener plate is attached to the outer face of the second end wall.

* * * * *